No. 893,121. PATENTED JULY 14, 1908.
W. A. WOOD.
SAW SET.
APPLICATION FILED MAY 27, 1907.
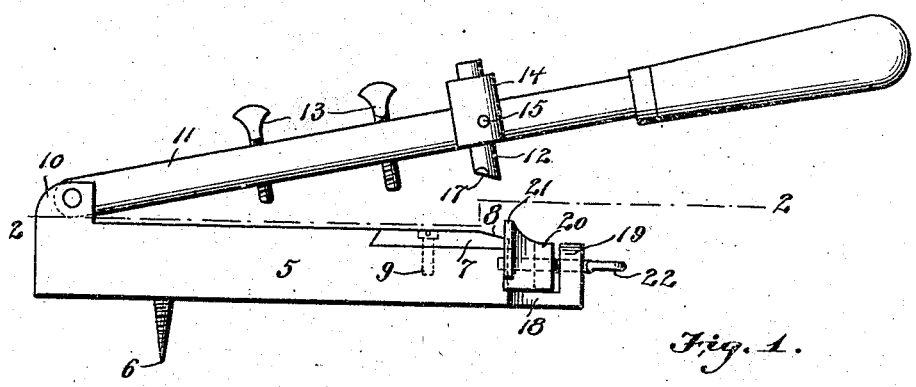
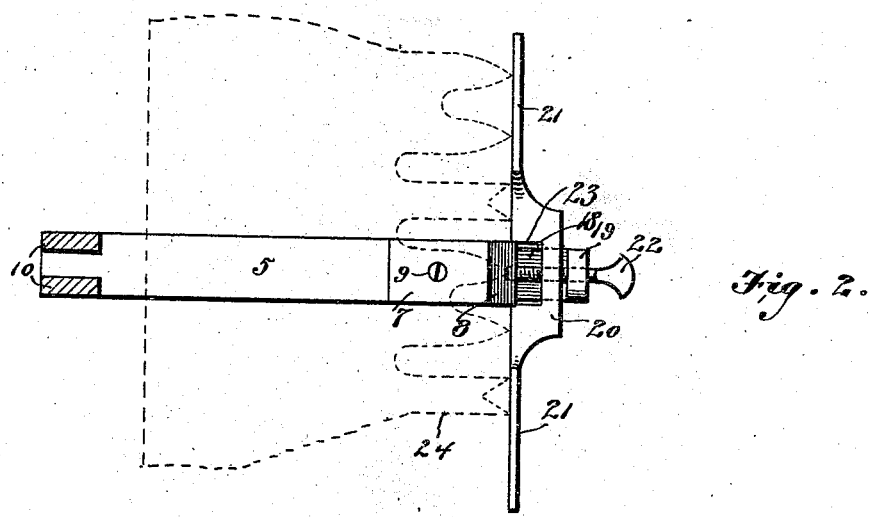
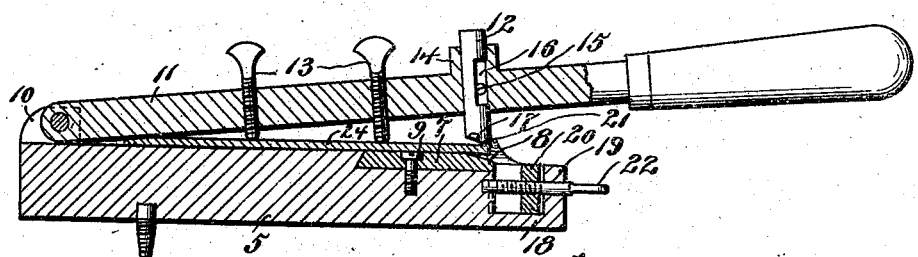
William A. Wood, Inventor

UNITED STATES PATENT OFFICE.

WILLIAM ARTHUR WOOD, OF GERMFASK, MICHIGAN.

SAW-SET.

No. 893,121.  Specification of Letters Patent.  Patented July 14, 1908.

Application filed May 27, 1907. Serial No. 375,887.

*To all whom it may concern:*

Be it known that I, WILLIAM ARTHUR WOOD, a citizen of the United States, residing at Germfask, in the county of Schoolcraft and State of Michigan, have invented certain new and useful Improvements in Saw-Sets of which the following is a specification.

This invention is a saw-set, and more particularly a tool of this kind in which the saw is held on a bevel-faced anvil and its teeth set by being struck with a punch.

The object of the invention is to provide improved means for holding the saw in order that there be no recoil to destroy the effect of the blow on the punch. The holding means are adjustable according to the thickness of the saw.

A further object is to provide a gage in order that the saw may be set true and uniformly.

In the accompanying drawings, Figure 1 is a side elevation of the invention. Fig. 2 is a horizontal section on the line 2—2 of Fig. 1. Fig. 3 is a longitudinal sectional view.

Referring specifically to the drawings, the anvil on which the saw is held comprises a block 5 having on the bottom a screw 6 for attachment to a work-bench or other suitable support. At the front end of the block in the top thereof, is a recess in which is fitted a steel plate 7 having a bevel face 8 which determines the degree of set. This plate is fastened in the recess by a screw 9.

At the rear end of the block 5 are cheeks 10 between which is pivoted a hand-lever 11 carrying a punch 12 and set screws 13 the latter being threaded through the lever. The lever has an enlargement 14 formed with a hole in which the punch is slidably mounted. The punch is held in the hole and prevented from dropping out of the same by a transverse pin 15 carried by the lever and passing through a slot 16 in the punch. The face 17 of the punch is beveled to conform to the bevel 8.

At the front end of the block 5 is an extension 18 having an upturned end 19. On said extension between the front end of the block and the part 19, is slidably mounted a gage comprising a block 20 having on opposite sides wings 21 which are presented laterally from the gage block and the anvil. The top edges of the wings are in a plane above that of the top of the anvil in order that the wings may engage the ends of the saw teeth when the saw is in position on the anvil. The gage is operated by a non-traveling screw 22 mounted in the part 19 and in the front end of the block 5. The gage block is recessed in its front end, as indicated at 23, to fit the front end of the block 5.

In use, the saw 24 is placed on the anvil with one of its teeth above the bevel 8. The gage is adjusted so that the wings engage the outer ends of the teeth. The hand-lever 11 is then swung down to hold the saw by the engagement of the set screws 13 therewith, they first being adjusted according to the thickness of the saw. By pressing down firmly on the hand-lever the saw will be securely held on the anvil. With the hand-lever in this position, the punch will be in engagement with the saw-tooth above the bevel 8, and upon striking the punch a blow with a hammer the desired set is given the tooth. The hand-lever is then swung away to release the saw and it is shifted forward to present another tooth to the anvil, and the preceding operation is repeated.

As the punch has an independent movement with respect to the hand-lever there is no recoil or jar when the punch is struck and the saw can be firmly held. The gage holds the saw in a uniform position so that each tooth is set the same. By means of the screw 22 the gage can be readily adjusted to vary the width of the set. The plate 7 can be removed and replaced when worn.

It is to be noted that the anvil extends across under the saw from front edge to back edge thereof, the anvil being ground straight from the bevel 8 on plate 7 to the rear end of the block 5, and consequently the saw blade lies firm and level on the anvil from the tooth to the back of the same. This is decidedly advantageous as compared to sets in which the edge only of the saw blade is held, or in which the blade is held between points on opposite sides, in which latter more or less bending of the blade takes place, with consequent variation of angle or set of the teeth.

I claim:

1. A saw-set anvil having a plane saw-supporting face and a bevel at one end thereof to determine the degree of set, in combination with a hand-lever pivoted to the opposite end of the anvil, a setting punch carried by the hand lever, and movable thereon opposite the bevel and set-screws threaded through the hand-lever and engageable with the saw for clamping it on the saw-supporting face of the anvil.

2. A saw set comprising an elongated anvil of sufficient length to extend across under the blade of the saw and support the same across its full width, and having a bevel at its front end, and a clamping lever pivoted to the rear end of the anvil, behind the back of the same, and arranged to swing downwardly and forwardly upon the saw blade, and having a punch slidably mounted thereon opposite the bevel.

3. In a saw set, the combination with an anvil having an extension at its end, of an adjustable gage supported on said extension and having wings extending laterally on both sides of the anvil and in line therewith, to engage the tips of the saw teeth.

4. In a saw set, the combination with an anvil having an extension with an upturned end, of a screw mounted in said end and located above the extension, and a gage block extending across above the extension and engaged by the screw for adjustment.

In testimony whereof I affix my signature, in presence of two witnesses.

WILLIAM ARTHUR WOOD.

Witnesses:
  JAMES ALLEN,
  JOHN LUPTON.